United States Patent
Herbold et al.

(10) Patent No.: US 7,093,477 B2
(45) Date of Patent: Aug. 22, 2006

(54) TORQUE SENSOR FOR CALIBRATING SCREWING TOOLS

(75) Inventors: Siegfried Herbold, Wuppertal (DE); Rainer Schwafertz, Remscheid (DE); Joachim Wilhelm, Wuppertal (DE)

(73) Assignee: Eduard Wille GmbH & Co KG, (DE)

( * ) Notice: Subject to any disclaimer, the term of this patent is extended or adjusted under 35 U.S.C. 154(b) by 337 days.

(21) Appl. No.: 10/602,097

(22) Filed: Jun. 23, 2003

(65) Prior Publication Data
US 2004/0003646 A1   Jan. 8, 2004

(30) Foreign Application Priority Data
Jun. 25, 2002   (DE) .......................... 202 09 850 U

(51) Int. Cl.
*G01L 3/00* (2006.01)
(52) U.S. Cl. ....................................... 73/1.11
(58) Field of Classification Search ................ 73/1.09, 73/1.11, 1.12, 862.08, 862.338, 862.337
See application file for complete search history.

(56) References Cited

U.S. PATENT DOCUMENTS

| | | | | |
|---|---|---|---|---|
| 2,403,952 A | * | 7/1946 | Ruge .................. | 73/862.338 |
| 4,649,757 A | * | 3/1987 | Crespin ................ | 73/862.06 |
| 4,759,225 A | * | 7/1988 | Reynertson et al. ..... | 73/862.21 |
| 5,181,425 A | * | 1/1993 | Livingston ............ | 73/862.08 |
| 5,672,834 A | | 9/1997 | Searle et al. | |

* cited by examiner

*Primary Examiner*—Robert Raevis
(74) *Attorney, Agent, or Firm*—Thorpe North & Western, LLP; Robert R. Mallinckrodt

(57) ABSTRACT

The invention relates to a torque sensor for calibrating screwing tools such as dynamometric keys or impact screw drivers. A torque sensor for calibrating screwing tools has an inner body defining an axis with respect to which a torque is to be measured. The inner body has a seat for engaugement of a screwing tool to be calibrated. An outer annular body is held stationary. This outer annular body is coaxial with the inner body and is connected therewith through radial webs of a first type and through radial webs of a second type. The first type webs have relatively large widths circumferentially but have relatively small axial dimensions. The second type webs are relatively narrow circumferentially but have relatively large axial dimensions. The torque sensor further comprises torsion measuring elements attached to said first type webs for measuring torsional deformation due to torques exerted on said inner body.

12 Claims, 3 Drawing Sheets

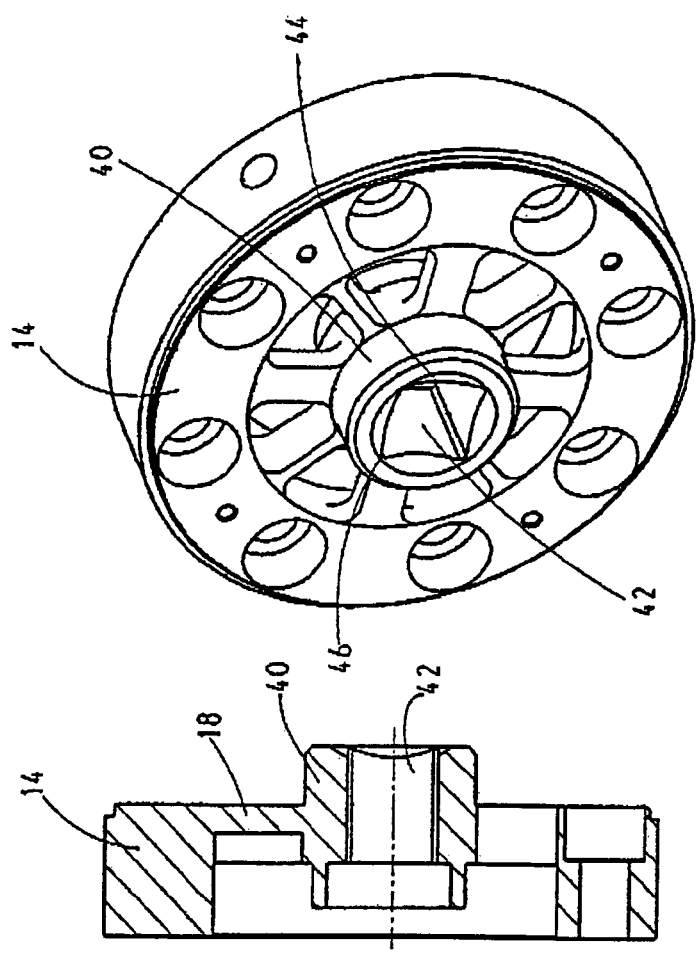
Fig. 4
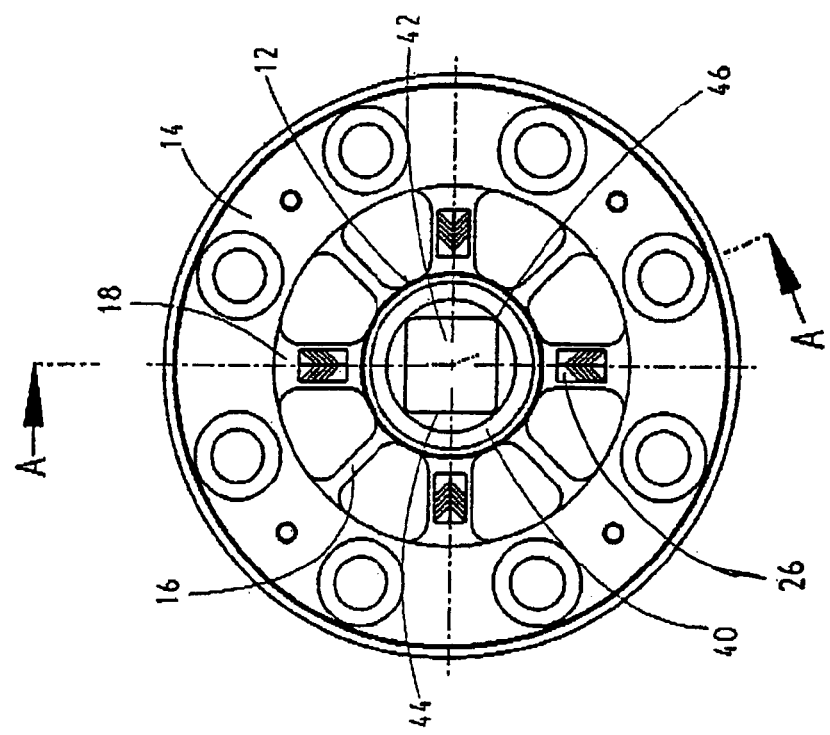
Fig. 3
Fig. 2

TORQUE SENSOR FOR CALIBRATING SCREWING TOOLS

BACKGROUND OF THE INVENTION

The invention relates to a torque sensor for calibrating screwing tools such as dynamometric keys or impact screw drivers.

DE 195 02 616 A1 discloses a torque sensor comprising an inner body having an axis with respect to which a torque is to be measured, and an outer annular body which surrounds the inner body coaxially and which is connected with the inner body through radial webs. There is a first type of web which has a relatively large width circumferentially but has relatively small axial dimensions. And there is a second type of web which is relatively narrow circumferentially but has relatively large axial dimensions. Measuring elements are attached to the first type webs.

The prior art torque sensor serves for the measurement of a torque which is transmitted by rotating parts. The annular body is attached to one rotating part by bolts. The inner body is a ring which is attached to the other rotating body, also by means of axial bolts. The driving torque is transmitted through the webs. Measuring elements in the form of strain gauges are arranged on the first type webs, which are circumferentially wide but relatively thin in axial direction. The strain gauges respond to torsion of the first type webs. The second type webs take up axial forces. The torque sensor of DE 195 02 616 A1 has two diametrically opposite wide and thin webs of the first type bearing the measuring elements. Furthermore, there are differently spaced second type webs symmetrical to the first type webs. The measured values are transmitted by wireless means.

There is a need of calibrating screwing tools. This calibration may consist in determining and, if necessary, adjusting the torque at which a dynamometric key releases. It is, however, also desirable to calibrate dynamically operating screwing tools such as impact screw drivers or wrenches, where the torque is measured which is exerted in impact form on a screwed connection.

DISCLOSURE OF THE INVENTION

It is, therefore, an object of the invention to provide a torque sensor for calibrating screwing tools.

To this end, a torque sensor for calibrating screwing tools is provided, comprising an inner body defining an axis with respect to which a torque is to be measured and having seat means for engaugement of a screwing tool to be calibrated. An outer annular body is held stationary, said outer annular body being coaxial with said inner body and being connected with said inner body through radial webs of a first type and through radial webs of a second type. Said first type webs have relatively large widths circumferentially but have relatively small axial dimensions. Said second type webs are relatively narrow circumferentially but have relatively large axial dimensions. The torque sensor further comprises torsion measuring means attached to said first type webs for measuring torsional deformation due to torques exerted on said inner body.

Thus the torque sensor does not measure the torque which is transmitted by a rotating shaft or the like, and, consequently, is not fixedly installed in the torque-transmitting assembly. Rather is the annular body of the torque sensor held stationary. A screwing tool to be calibrated is coupled to the inner body. Then, the torque exerted by the screwing tool on the inner body is measured.

When calibrating a dynamometric key, the exerted torque is increased until the dynamometric key releases. This is a dynamic process. The torque exerted when the dynamometric key releases has to be measured accurately and unaffected by disturbing torques. When calibrating dynamically operating screwing tools, the dynamic behavior of the torque sensor and the suppression of disturbing torques is of particular importance.

In order to compensate for such disturbing torques, said first type webs may form a first cross of four first type webs angularly spaced by 90° about said axis. Said second type webs may form a second cross of four second type webs angularly spaced by 90° about said axis, said second cross being angularly offset relative to said first cross by 45°. Said torsion measuring means may comprise measuring elements on all four first type webs, said measuring elements being interconnected to provide a measured value indicative of the torque exerted on said inner body about said axis while substantially compensating for disturbing torques.

Preferably, the inner body has a moment of inertia which is so small that, when calibrating dynamically working screwing tools, the inertial forces caused by the inertia of the inner body are negligible as compared to the forces acing on the first type webs.

This can be achieved by different measures. One such measure consists of the inner body having radial dimensions which are small as compared to the radial dimensions of the annular body. Another measure is said inner body consisting of a material which has a low specific weight as compared with the material of the annular body. Eventually, said inner body may have regularly arranged apertures for reducing the moment of inertia.

In a preferred embodiment, said central seat means of said inner body comprise a hub having a square aperture with side faces and edges. It has been found that optimum measuring results can be achieved, if said side faces of said square aperture are aligned with said first type webs, and said edges of said square aperture are aligned with said second type edges.

Two embodiments of the invention are described hereinbelow with reference to the accompanying drawings.

BRIEF DESCRIPTION OF THE DRAWINGS

FIG. 2 is a front view of a second embodiment of the torque sensor.

FIG. 3 is a sectional view taken along line A—A of FIG. 2

FIG. 4 is a perspective illustration similar to FIG. 1 of the second embodiment of the torque sensor.

PREFERRED EMBODIMENTS OF THE INVENTION

Figure 1:
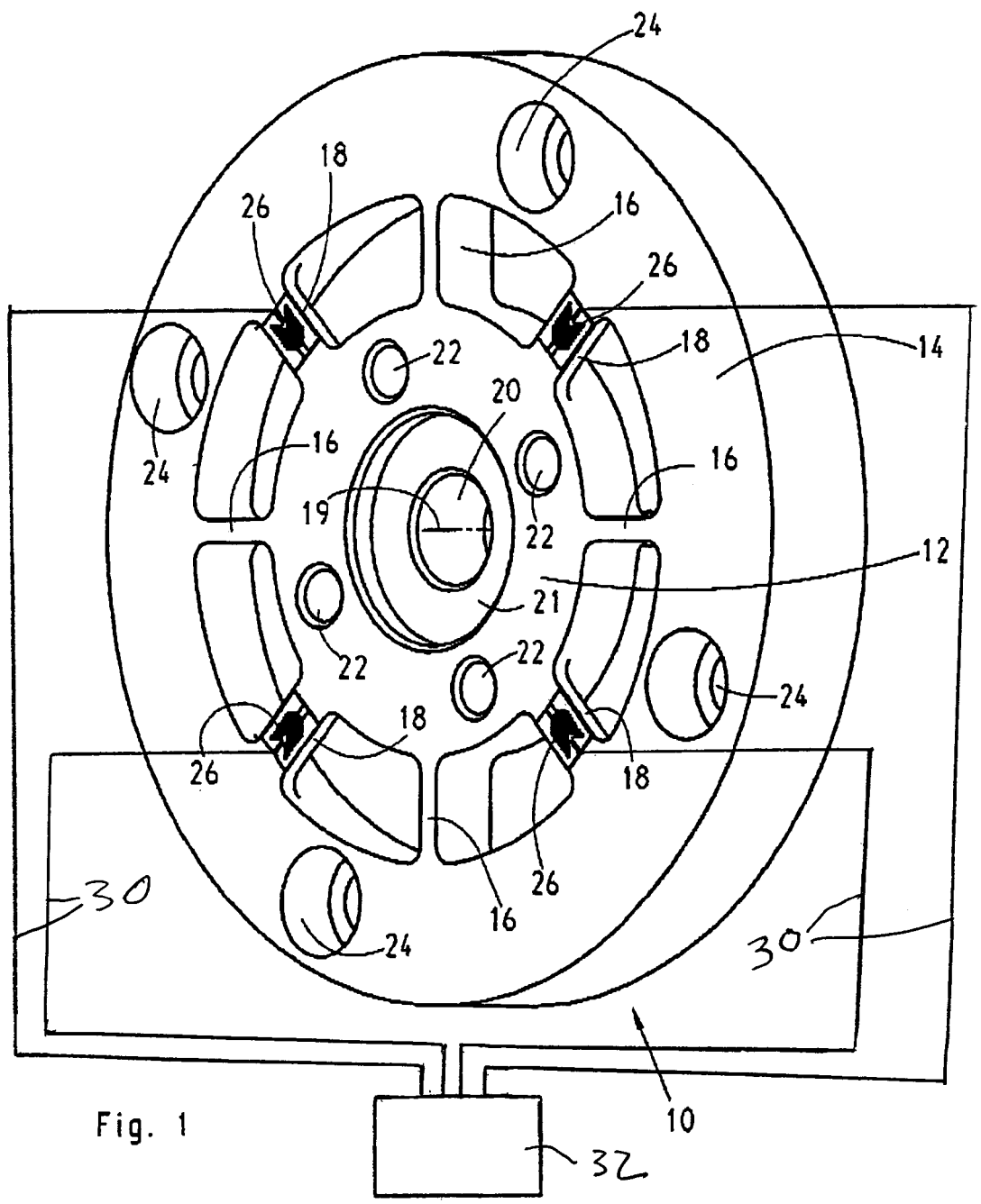
FIG. 1 is a perspective view of a torque sensor for calibrating screwing tools.

Referring to FIG. 1, numeral 10 generally designates a torque sensor. The torque sensor 10 has an inner body 12. The inner body 12 is surrounded coaxially by an outer annular body 14. The inner body 12 is connected with the outer annular body through webs 18 of a first type and webs 16 of a second type. The first type webs 18 are circumferentially wide as compared to the second type webs 16. The axial dimensions, however, of the first type webs are small. Virtually, the webs 18 are flat plates in a plane normal to the axis of the torque sensor. The second type webs 16 are narrow in circumferential direction. The axial dimensions of the webs 16, however, are large relative to the webs 18, the webs extending through the whole depth of the outer annular body 14.

The outer annular body is held stationary. To this end, the outer annular body is affixed to a carrier such as a wall by means of bolts (not shown) which pass through bores 24.

The webs 18 substantially take up the torque acting about the axis of the torque sensor. Consequently, measuring elements 26 for torque measurement in the form of strain gauges are affixed to the first type webs 18. The webs 16 serve to stabilize the assembly against axial forces, while contributing little to the taking-up of the torque in circumferential direction.

Four first type webs 18 are provided. These webs 18 are angularly spaced by 90° about a central axis 19 and form a first cross of webs. Furthermore, there are four second type webs, which are angularly spaced by 90° and form a second cross. The second cross, in turn, is angularly offset about the axis 19 relative to the first cross. Thus alternatingly first type webs 18 and second type webs 16 are provided in regular arrangement. Each first type web 18 carrying a measuring element 26 has a web of the same type with a measuring element diametrically opposite. There are two orthogonal pairs of such webs 18 with measuring elements 26.

A bore 20 and a recess 21 communicating therewith are provided in the center of the inner body 12. This bore 20 and recess 21 serve to accommodate an axle-shaped torque transmitting member of a screwing tool (not shown) to be calibrated. The torque transmitting member is affixed in the bore 20 and recess 21 by appropriate means.

In order to reduce the moment of inertia of the inner body 12, the inner body 12 has apertures or bores 22 in regular array. In order to reduce the moment of inertia further, the inner body 12 is made of a material having low specific weight. The specific weight of this material is smaller than the specific weight of the outer annular body 14. Also the radial dimensions of the inner body 12 are kept as small as possible to reduce the moment of inertia.

The measuring elements 26 are connected, through fixed cables 30, with a signal processing circuit 32. The measuring elements 26 are interconnected such that a measured value indicative of the torque acting about the axis 19 is obtained, disturbing torques being compensated for.

FIGS. 2 to 4 show a similar torque sensor having an inner body 12 and an outer annular body 14 held stationary, the two bodies being interconnected by first type webs 18 and second type webs 16. The first type webs 18 are angularly spaced by 90° as well as the second type webs 16. The webs 18 and 16 form two crosses, which are mutually offset angularly by 45°. Corresponding elements bear the same reference numerals, in FIGS. 2 to 4, as in FIG. 1.

In the embodiment of FIGS. 2 to 4, the inner body 12 is a hub with a square aperture 42 therethrough. The square aperture 42 has its side faces 44 aligned with the first type webs 18, and has its edges or corners 46 aligned with the second type webs 16. The square aperture 42 can accommodate a square of a screwing tool, for example a dynamometric key or an impact screw driver. Also in the embodiment of FIGS. 2 to 4, the moment of inertia of the inner body is kept small.

Figure 5:
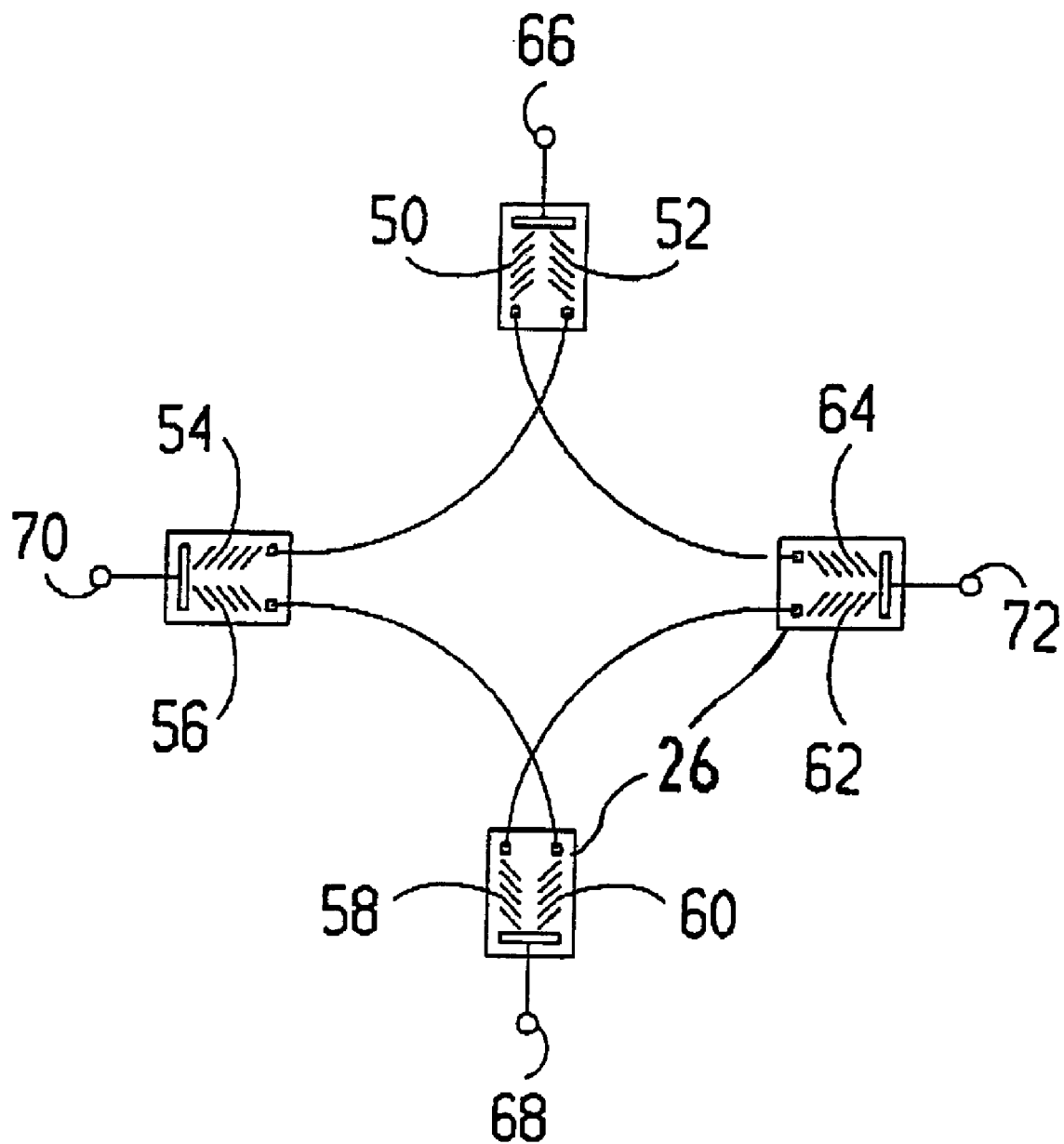
FIG. 5 is a schematic wiring diagram of the circuit containing the measuring elements.

FIG. 5 shows the circuit of the measuring elements, which, in FIGS. 1 and 2, are generally designated by 26. Each measuring element 26 consists of a pair of strain gauges 50,52; 54,56; 58,60 and 62,64 arranged parallel and substantially radial on the first type webs 18. The stain gauges of each pair are interconnected at a first end, the radially outer end in FIG. 5. A second end of each strain gauge, the inner end in FIG. 5, is connected with the second end of a strain gauge of a neighboring pair: The second end of the strain gauge 52 is connected with the second end of the strain gauge 54 of one of the pairs orthogonal to the strain gauges 50,52, namely the pair 54,56 at the left and horizontal in FIG. 5; and the second end of the strain gauge 50 is connected with the second end of the other pair orthogonal to the strain gauges 50,52, namely the pair 62,64 at the right and horizontal in FIG. 5. The second end of the strain gauge 60 of the pair 50,52 is connected with the second end of the strain gauge 60 of the pair 58,60, which is substantially aligned with the pair 50,52. The second end of the strain gauge 58 of the pair 58,60 is connected with the second end of the strain gauge 62 of the pair 62,64. The strain gauges 50,52 and 58,60 are attached to the diametrically opposite webs 18 arranged vertically in FIG. 2. The strain gauges 54,56 and 62,64 are attached to the diametrically opposite webs 18 arranged horizontally in FIG. 2. The strain gauges form a bridge circuit. The bridge voltage is applied between a terminal 66, which is connected between the first ends of the strain gauges 50,52, and a terminal 68, which is connected between the first ends of the strain gauges 58, 60. A measuring signal is picked off between a terminal 70, which is connected between the strain gauges 54,56, and a terminal 72, which is connected between the strain gauges 62 and 64.

We claim:

1. A torque sensor for calibrating screwing tools, comprising an inner body defining an axis with respect to which a torque is to be measured and having seat means for engagement of a screwing tool to be calibrated, and an outer annular body held stationary, said outer annular body being coaxial with said inner body and being connected with said inner body through radial webs of a first type and through radial webs of a second type, said first type webs having relatively large width circumferentially but having relatively small axial dimensions, and forming a first cross of four first type webs angularly spaced by 90° about said axis, and said second type webs being relatively narrow circumferentially but having relatively large axial dimensions and forming a second cross of four second type webs angularly spaced by 90° about said axis, said second cross being angularly offset relative to said first cross by 45°, and further comprising torsion measuring means attached to said first type webs for measuring torsional deformation due to torques exerted on said inner body, said torsion measuring means comprising measuring elements on all four first type webs, said measuring elements being interconnected to provide a measured value indicative of the torque exerted on said inner body about said axis while substantially compensating for disturbing forces.

2. A torque sensor as claimed in claim 1, wherein the inner body has a moment of inertia which is so small that, when calibrating dynamically working screwing tools, the inertial forces caused by the inertia of the inner body are negligible as compared to the forces acting on the first type webs.

3. A torque sensor as claimed in claim 2, wherein the inner body has radial dimensions which are small as compared to the radial dimensions of the annular body.

4. A torque sensor as claimed in claim 2, wherein said inner body consists of a material which has a low specific weight as compared with the material of the annular body.

5. A torque sensor as claimed in claim 2, wherein said inner body has regularly arranged apertures for reducing the moment of inertia.

6. A torque sensor as claimed in claim 1, wherein said seat means of said inner body comprise a hub having a square aperture with side faces and edges.

7. A torque sensor as claimed in claim 6, wherein said side faces of said square aperture are aligned with said first type webs, and said edges of said square aperture are aligned with said second type webs.

8. A torque sensor for calibrating screwing tools, comprising an inner body defining an axis with respect to which a torque is to be measured and having seat means for engagement of a screwing tool to be calibrated, and an outer annular body held stationary, said outer annular body being coaxial with said inner body and being connected with said inner body through radial webs of a first type and through radial webs of a second type, said first type webs having relatively large width circumferentially but having relatively small axial dimensions, said second type webs being relatively narrow circumferentially but having relatively large axial dimensions, and said inner body consisting of a material which has a low specific weight as compared with the material of the annular body whereby the inner body has a moment of inertia which is so small that, when calibrating dynamically working screwing tools, the inertial forces caused by the inertia of the inner body are negligible as compared to the forces acting on the first type webs, and further comprising torsion measuring means attached to said first type webs for measuring torsional deformation due to torques exerted on said inner body.

9. A torque sensor as claimed in claim 8, wherein the inner body has radial dimensions which are small as compared to the radial dimensions of the annular body.

10. A torque sensor as claimed in claim 8, wherein said inner body has regularly arranged apertures for reducing the moment of inertia.

11. A torque sensor as claimed in claim 8, wherein said central seat means of said inner body comprise a hub having a square aperture with side faces and edges.

12. A torque sensor as claimed in claim 11, wherein said side faces of said square aperture are aligned with said first type webs, and said edges of said square aperture are aligned with said second type webs.

* * * * *